United States Patent [19]

Jakatdar et al.

[11] Patent Number: 4,852,171
[45] Date of Patent: Jul. 25, 1989

[54] APPARATUS AND METHOD FOR SPEECH RECOGNITION

[75] Inventors: Priyadarshan Jakatdar, Hamden; Hoshang D. Mulla, Trumbull, both of Conn.

[73] Assignee: Alcatel USA Corp., New York, N.Y.

[21] Appl. No.: 670,521

[22] Filed: Nov. 9, 1984

[51] Int. Cl.⁴ .............................................. G10L 7/08
[52] U.S. Cl. ..................................................... 381/43
[58] Field of Search .................................. 381/41–50; 364/513.5

[56] References Cited

U.S. PATENT DOCUMENTS

| | | | |
|---|---|---|---|
| 3,727,193 | 4/1973 | Bolie | 382/39 |
| 4,319,085 | 3/1982 | Welch et al. | 381/43 |
| 4,394,538 | 7/1983 | Warren et al. | 381/43 |
| 4,559,604 | 12/1985 | Ichikawa et al. | 364/513.5 |
| 4,587,670 | 5/1986 | Levinson et al. | 381/43 |
| 4,720,802 | 1/1988 | Damoulakis et al. | 364/513.5 |

OTHER PUBLICATIONS

Purton, "Speech Recognition Using Autocorrelation Analysis", IEEE Trans. on Audio and Electroacoustics, vol. AU-16, No. 2, Jun. 1968.

Glenn, "Template Estimation for Word Recognition", Proceedings IEEE PRIP 78, pp. 514–516.

Primary Examiner—Gary V. Harkcom
Assistant Examiner—John A. Merecki
Attorney, Agent, or Firm—Peter C. Van Der Sluys

[57] ABSTRACT

A template-matching speech recognition system has a plurality of reference templates each having a plurality of addressable positions, each position storing a value corresponding to the probability of the occurrence of a particular binary value in a corresponding position in an utterance template for speech represented by the referenced template. A system bias template having a corresponding plurality of positions for storing values therein that are representative of the probability of the particular binary value occurring in a corresponding position of any utterance template. A match between an utterance template and a reference template is determined when the sum of the stored probabilities from the reference template positions, corresponding to the positions in the utterance template containing the particular binary value, exceed a predetermined threshold.

28 Claims, 4 Drawing Sheets

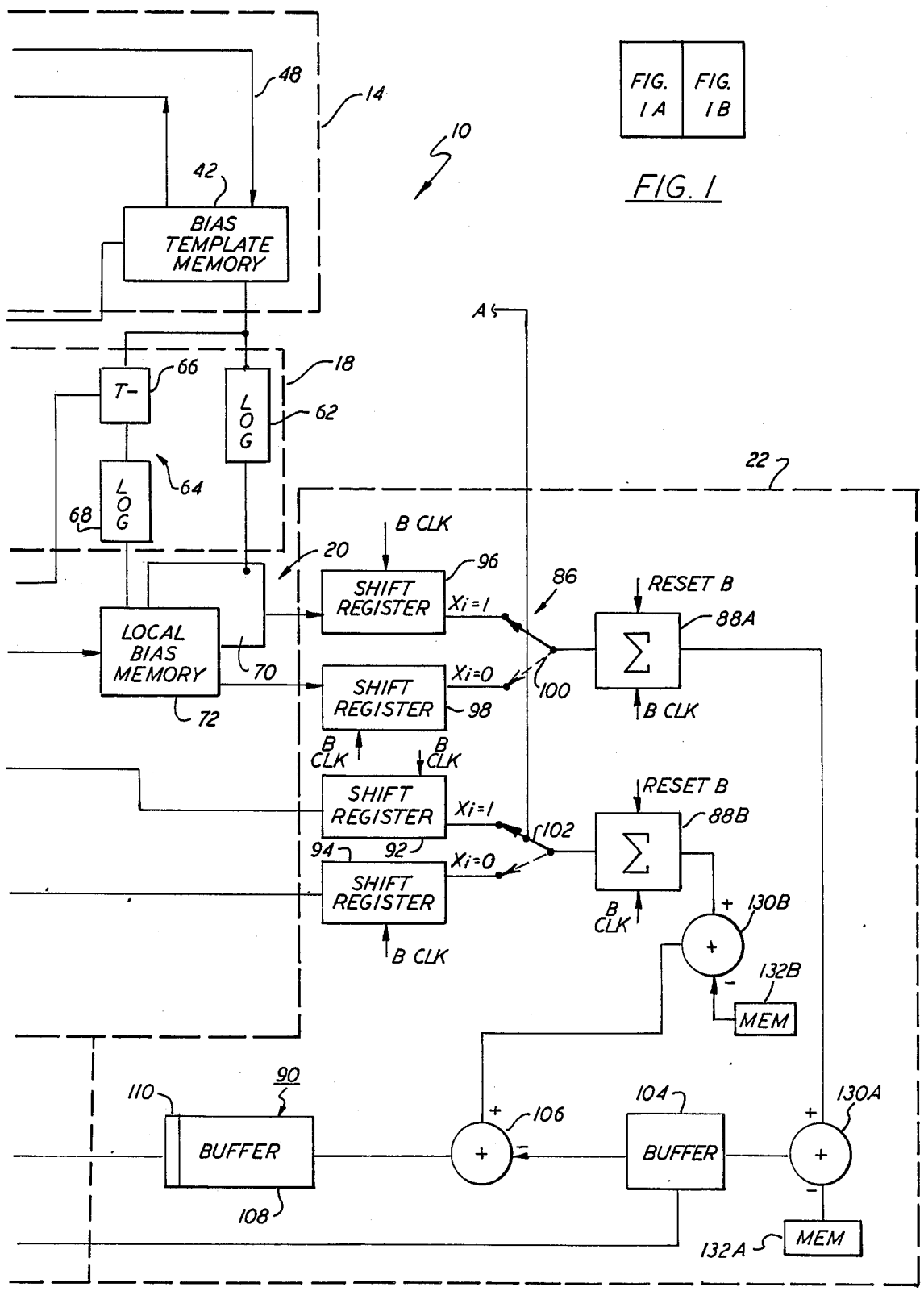

|  IN  | OUT |
|------|-----|
| 0    | 0   |
| 1    | 14  |
| 2    | 44  |
| 3    | 62  |
| 4    | 74  |
| 5    | 84  |
| ...  | ... |
| 100  | 214 |
| ...  | ... |
| 110  | 218 |
| ...  | ... |
| 200  | 244 |
| ...  | ... |
| 240  | 252 |
| ...  | ... |
| 256  | 255 |
FIG. 2
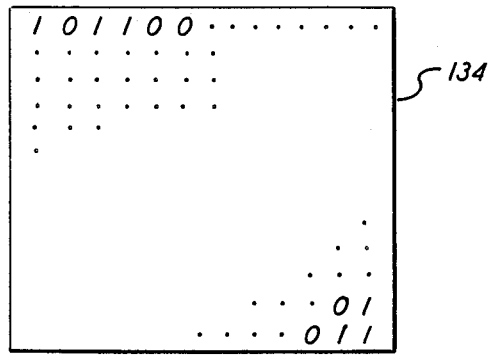
FIG. 3A
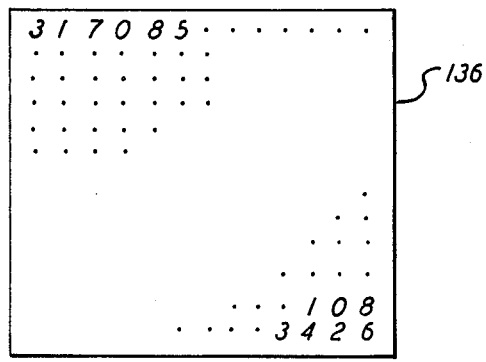
FIG. 3B
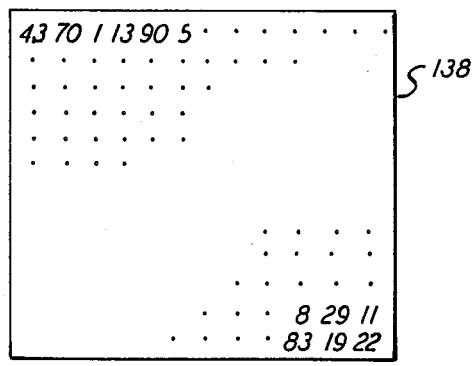
FIG. 3C

APPARATUS AND METHOD FOR SPEECH RECOGNITION

CROSS-REFERENCE TO RELATED APPLICATIONS:

This application is related to one, or more, of the following United States Patent Applications: Ser. No. 659,989, U.S. Pat. No. 4,799,144 filed Oct. 12, 1984; Ser. No. 670,436 filed on Nov. 9, 1984. All of the above applications are assigned to the assignee hereof.

BACKGROUND OF THE INVENTION

The present invention generally relates to an apparatus and method for identifying spoken words and, in particular, relates to such an apparatus compensating for any system-wide bias and employing reference templates containing all information generated during the enrollment phase.

The electronic identification of a spoken word or phrase has been the goal of many researchers for many years. One common solution included generating a "voice print" or pattern that, essentially, was the electronic result of a time-based amplitude varying signal. The pattern was compared to a library of previously generated word patterns. Such an approach encountered numerous difficulties that were speaker dependent and/or required elaborate analog circuits to reproduce and compare the various word patterns.

More recently, considerable work has been dedicated to a word recognition technique generally referred to as template matching. In template matching, an array of binary numbers representative of features of any spoken word is generated. These templates, generally known as utterance templates, are then compared, i.e. scored, against a stored vocabulary of reference templates. Conventionally, reference templates are developed during an enrollment stage wherein a particular word, or list of words, is repeated and the resultant template for a given word is developed from the features common to all repetitions of that word. The array positions wherein the result perceived was not constant throughout the entire enrollment are not used in the scoring. The rational for such a reference template generation scheme is that it is generally believed that, for accurate comparisons, the format and content of reference templates must be identical to the format and content of the utterance templates being analyzed.

For example, a conventional reference template is formed such that, on any given repetition during enrollment, if the binary value for a specific bit position is identical to all previous binary values for that position, the updated position is assigned that binary value. However, if, on any repetition, that bit position is perceived as a binary value different than all the previous binary values therefor, that bit location becomes empty, i.e., becomes an unknown. Nevertheless, unless a bit postion assumes a particular value for all enrollment repetitions, less than all of the total information extracted from speech signals for that word during enrollment is used during the word recognition process.

During conventional scoring, an utterance template, representing the extracted features of a speech signal of the word to be identified, is compared with all reference templates in the library. After comparing each bit position in the utterance template with the corresponding bit position of a reference template, a score is developed for that reference template. The utterance template is scored against each reference in the library. The scores so developed are then analyzed to determine whether or not any reference template scored high enough to identify the word represented by the utterance template. However, based on the reference template bit retention technique discussed above, each reference template includes a number of bit positions which are "unknown." Further, the number of "unknowns" varies among the reference templates. Consequently, the comparison between any given reference template and the utterance template being analyzed is ambiguous.

Another difficulty that compounds the ambiguity of conventional systems is that a system-wide bias occasionally exists during enrollment. Such a bias results in a bit position in all the reference templates being assigned a specific binary value regardless of the binary value in that bit position of the utterance template for any word spoken, or the number of times a word is enrolled.

In addition, some present template scoring schemes develop a score based on algorithms formulated to require a substantial number of multiplications and additions to calculate scores. Hence, due to the substantial number of computational steps required, the identification of spoken words is, presently, quite slow even with the use of modern high speed microprocessers. This is inherent because inter alia, multiplication is one of the slowest tasks that any arithmatic microprocessor performs.

SUMMARY OF THE INVENTION

Accordingly, it is one object of the present invention to provide an apparatus and method for identifying spoken words that is both accurate and rapid.

This object is accomplished, at least in part, by an apparatus and method having a library composed of a plurality of reference templates wherein each addressable position of each reference template effectively represents the probability of the occurrence of a particular binary value thereat and has provision for eliminating any system-wide bias.

Other objects and advantages will become apparent to those skilled in the art from the following detailed description read in conjunction with the appended claims and the drawings attached hereto.

BRIEF DESCRIPTION OF THE DRAWING

FIG. 2 is a logarithmic scale modified for use in conjunction with the present invention.

FIG. 3A–3C is an example of various template formats useful in the present invention.

DETAILED DESCRIPTION OF THE INVENTION

Figure 1A:
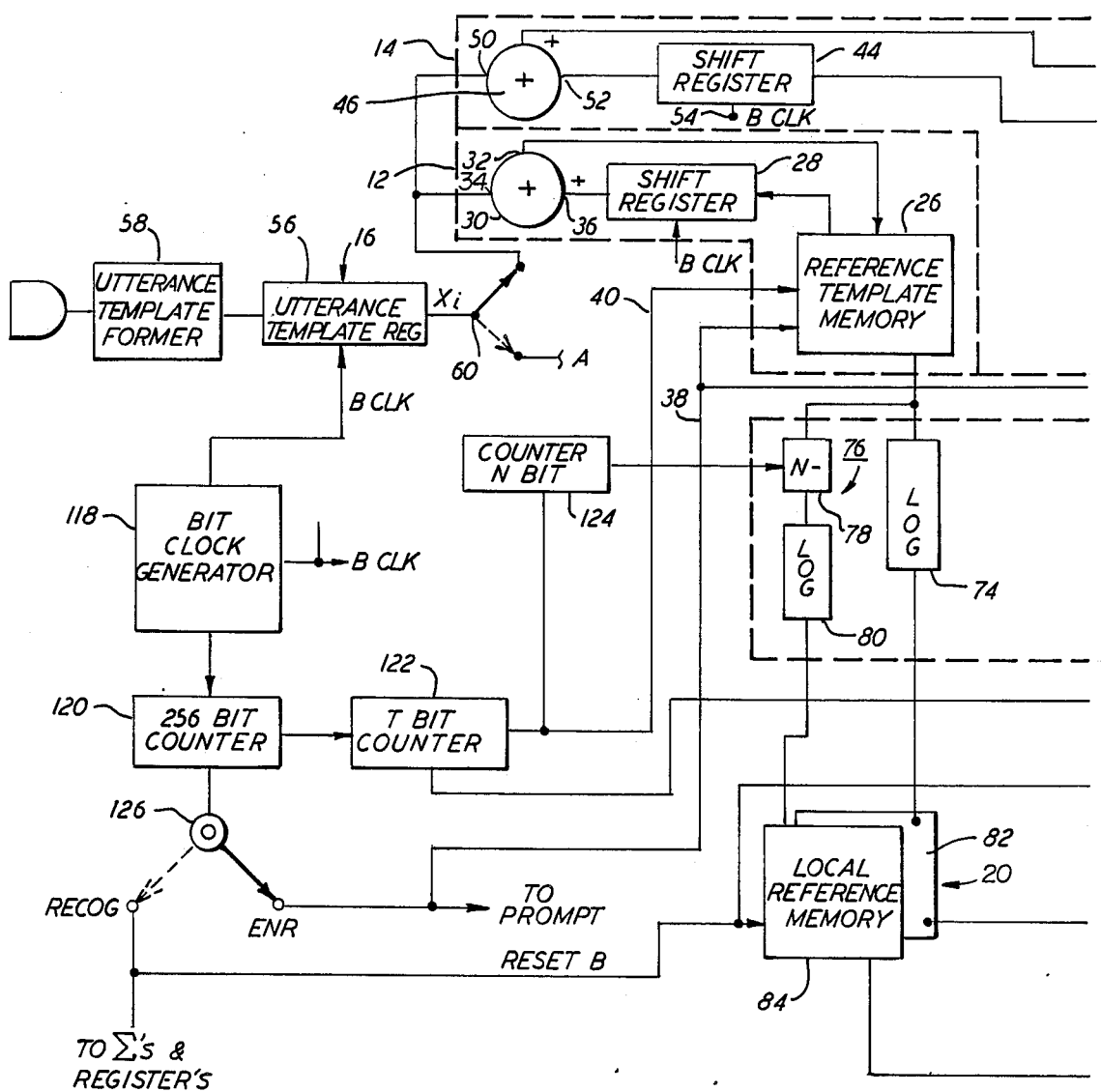
FIG. 1 is comprised of FIGS. 1A and 1B and is a block diagram of a word recognition apparatus embodying the principles of the present invention.
Figure 1A:
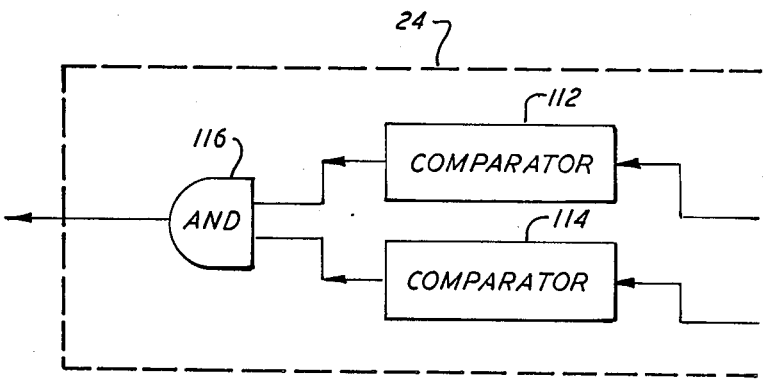

An apparatus, generally indicated at 10 in FIG. 1 and embodying the principles of the present invention, includes means 12 for creating and storing a plurality of reference templates, means 14 for creating and storing a system bias template, means 16 for accessing an utterance template, and means 18 for modifying the plurality of stored reference templates and the system bias template. In addition, the apparatus 10 further includes means 20 for storing the modified reference and system bias templates, means 22 for establishing a score for the modified templates with respect to an accessed utterance template and means 24 for accepting or rejecting a score, whereby when a score is accepted the reference template corresponding thereto represents the utterance represented by the accessed utterance template.

In the preferred embodiment, the means 12 for creating and storing a plurality of reference templates includes a storage medium 26, a shift register 28, a summer 30 having an output 32 and first and second inputs, 34 and 36 respectively, means 38 for addressing a particular reference template and means 40 for simultaneously addressing a particular position of the particular reference template addressed by the addressing means 38 and the corresponding position of shift register 28.

Similarly, the means 14 for creating and storing a system bias template includes a storage medium 42, a shift register 44, a summer 46 having an output 48 and first and second inputs, 50 and 52 respectively, and means 54 for simultaneously addressing a particular position of both the storage medium 42 and the shift register 44. As more fully discussed below, the creating and storing means, 12 and 14, respectively, are active during enrollment and inactive during recognition.

The means 16 for accessing an utterance template includes a shift register 56 adapted to receive an outputted utterance template from an utterance template former 58. Preferably, the shift register 56 is connected to the reference template creating and storing means 12 and the bias template creating and storing means 14 via switching means 60. An utterance template former 58 particularly adapted for use with the apparatus 10 is fully discussed and described in co-pending U.S. Patent Application, Ser. No. 670,436, filed on even date herewith and assigned to the assignee hereof and is deemed incorporated by reference herein.

The storage medium 26 of the reference template creating and storing means 12 has a capacity at least equal to the product of the number of bytes per template times the number of templates to be stored. For example, using templates having 256 bytes and enrolling 200 different templates, for example, wherein each template represents one spoken word, a capacity of 512 kilobytes is required. The contents of the reference template storage medium 26 addressed by the addressing means 38 is outputted to the shift register 28. The shift register 28 includes, in this example, 256 bytes i.e. one reference template worth of bytes. The output of the shift register 28 is connected to the summer 30 via, for example, the second input 36 thereto. The first input 34 to the summer 30 is connected to the utterance shift register 56 via switching means 60. The output of the summer 30 represents, for each word, the number of times a selected binary value (for example, a binary one) occurred at that position in the shift register 28, i.e. the previous total, plus the occurrence of that bit value in the utterance shift register 56. Thus, the output of summer 30 is an updated total of occurrences of the selected binary value for each position. Hence, by this arrangement, each stored reference template maintains a running sum of the occurrences of the selected binary value for each position for each reference template. Consequently, as more fully discussed below, all data provided by the utterance template former 58 is retained.

The storage medium 42 of the bias template creating and storing means 14 has a capacity at least equal to the number of addressable positions in an utterance template. In the preferred embodiment this capacity is 256 bytes. The contents of the bias template, during enrollment are written into the shift register 44 which is connected to the second input 52 of the summer 46. The first input 50 of the summer 46 receives the bit information from the corresponding position in the shift register 56 having the accessed utterance template therein. The output 48 of the summer 46, therefore, delivers a continuous updated total of the occurrence of a selected binary value for each position to the storage medium 42.

For example, for any given utterance template the bits therein are ones or zeros, i.e. binary highs or lows. However, the information in the corresponding position of the shift register 44 represents the total number of occurrences of the selected value that previously occurred at that position, regardless of the associated utterance template or the number of repetitions of reference templates. Naturally, the summer 46 can be alternatively adapted to count only the occurrence of binary zeros at each position. Nevertheless, as more fully discussed below, all information from all utterance templates formed and used throughout the entire enrollment is retained in the bias template storage medium 42 and used in the subsequent scoring of unknown utterance templates.

In the preferred embodiment, when utterance templates representing unknown words are to be identified, the contents of the storage mediums, 26 and 42 are downloaded to the means 20 after being modified by the means 18. Essentially, the means 18 for modifying the plurality of reference templates and the system bias template, for each position, provides a pair of outputs representing the logarithmic values of the number of occurrences at that position of binary ones and binary zeros.

In one particular embodiment, the means 18 includes a first logarithmic converter 62 adapted to received the system bias template from the storage medium 42 on a byte-by-byte basis. In addition, the converter 62 is connected in parallel with a complementary binary byte logarithmic former 64. The former 64 includes a subtraction means 66 serially connected with a second logarithmic converter 68. The subtraction means 66 is provided, as more fully discussed below, with the total number of utterance templates enrolled (T) from which the number in each position is subtracted on a byte-by-byte basis. That is, if the positions in storage medium 42 represent the occurrences of binary ones, the output of the subtraction means 66 represents the number of occurrences of binary zeros for those same positions. Thus, the outputs from the first and second logarithmic converter, 62 and 68, respectivelym represent the logarithmic values of all data for that bit position established during enrollment. The outputs from the logarithmic converter, 62 and 68, are stored in an expanded storage medium, 70 and 72, respectively, in the storing means 20.

The means 18 also includes a similar arrangement adapted to receive the plurality of reference templates from the storage medium 26 on both a per reference template basis and a byte-by-byte basis for each stored reference template. Specifically, a third logarithmic converter 74 is connected in parallel with a reference template complimentary logarithmic former 76. The former 76 having a serially connected subtraction means 78 and a fourth logarithmic converter 80. In this instance, the minuend stored in the subtraction means 78 is the number of times the word represented by a particular reference template was enrolled. Thus, the outputs for the third and fourth logarithemic converts, 74 and 80, respectively, represent the logarithmic values of all data for that position of each word established during enrollment. The outputs of the third and fourth logarithmic converters, 74 and 80, are stored in a plurality of expanded storage medium, 82 and 84, respectively, in the storing means 20.

As a result, the means 20 for storing the modified plurality of reference templates and the modified system bias templates includes the storage mediums, 70 and 72, each having 256 bytes, i.e. one template array, and storage mediums, 82 and 84, containing the plurality of reference templates formatted as complementary pairs of 256 byte arrays for each word stored.

The means 22 for establishing a score for the modified templates with respect to an utterance template includes a means 86 for selecting a byte from one of the storage medium, 70 or 72, and a byte from one of the storage mediums, 82 or 84 for each reference template, means 88 for summing all bytes from the selecting means 86 for the system bias template and for each of the reference templates, and means 90 for storing the sums of the means 88.

In the preferred embodiment, the means 86 includes first and second shift registers, 92 and 94 respectively, adapted to receive the data stored in the storage mediums, 82 and 84, respectively, for a given reference template. The means 86 further includes a system bias template byte selection means 100 and a reference template byte selection means 102. The byte selection means, 100 and 102, are mutually positioned according to the bit presented by the corresponding binary value of the bit in the position in the utterance shift register 56. For example, if the binary value of a particular bit position in the shift register 56 is a binary one the shift registers, 92 and 96, are selected. The shift registers, 92 and 96, as previously discussed, correspond to the storage mediums, 70 and 82 respectively, having the values of the occurrences of binary ones therein. Conversely, if the binary value in the shift register 56 is a binary zero, the shift registers, 94 and 98, are selected.

The values from the selected shift registers, i.e. either, 92 and 96, or, 94 and 98 are separately summed by the summing means 88A and 88B, each maintaining a single running total for all values of the selected registers, 92 and 96, or 94 and 98, for each 256 bytes, i.e. each reference template. Preferably, as more fully discussed below, after each 256 bytes, i.e. after each reference template, the accumulated sums from the summing means, 88A and 88B are weighted.

The weighted sum from the system bias summer 88A is stored in a first buffer 104 and, by means of a summer 106, subtracted from each weighted sum from the word storage mediums, 82 and 84. The output of summer 106, for each reference template, is stored in a second buffer 108. Preferably, the second buffer 108 includes means 110 for selecting and outputting the highest value stored therein. The outputs from the first and second buffers, 104 and 108, are inputted to the means 24 for accepting or rejecting a score.

In the preferred embodiment, the means 24 includes first and second comparators, 112 and 114, and a logic AND gate 116. The second comparator 114 receives, as an input thereto, the system bias score from buffer 104 and includes, i.e. compares that score with, a preselected, or threshold value. If the sum from buffer 104 exceeds the threshold value a binary one, for example, is outputted to one input of the AND gate 116. The first comparator 112 receives, as an input thereto, the highest value in the buffer 108 and includes, for comparison purposes, a preselected value, or threshold, stored therein. If the value from the buffer 108 exceeds the threshold a binary one, for example, is outputted to the other input of the AND gate 116. If, and only if, both inputs to the AND gate 116 are binary ones, an acceptance signal, i.e., a particular binary value, is outputted from the AND gate 116. The signal so outputted can then be used, by known techniques, for any purpose such as, to execute a preselected command within a computer.

The apparatus 10 further includes a bit clock generator 118 that provides pulses at a regular, preselected frequency for ensuring coordination of data flow and synchronization of data scoring. The output pulse of the generator 118 is designated as BCLK in FIG. 1. As shown, the active position of each shift register, 28 and 44 during enrollment, and, 56, 92, 94, 96, and 98 during recognition is controlled by a pointer according BCLK. Further, the summing means 88 and the storage mediums, 26 and 42 during enrollment, and 70, 72, 82 and 84 during recognition are stepped according to the BCLK. The number of pulses from the bit clock generator 118 is monitored by a counter 120 which produces an output signal, RESET B, after every 256 BCLK clock pulses, i.e. after one template has been operated on.

The RESET B signal controls the reference template presented by the storage mediums, 26, 82 and 84. In addition, the RESET B signal controls the summing means 88 such that, upon receiving the RESET B signal, the accumulated sums therein are outputted therefore. A bias template counter 122 counts the total number of utterance templates enrolled and maintains that sum in subtraction means 66. A reference template counter 124 is provided to count the number of times a particular word is enrolled. The output of the reference template counter 124 is provided to the subtraction means 76.

During enrollment the output from the 256 bit counter 120 is connected, via switch means 126, to a prompter for indicating to the trainer to recite the next word. During recognition the output from the counter 120 is connected to the shift register, 92, 94, 96, and 98, and the bit summing means 88.

Referring to FIG. 2, exemplary modified logarithmic scale 128 is shown which scale is preferably used in the log converters, to determine the outputs thereof. Most noticably is that if the input is equal to zero the output is set to zero. Ordinarily, of course, the logarithmic value of zero is equal to negative infinity. However, such a value would have no real meaning in the present apparatus or the calculations made therein. In addition, to ensure that the entire log converter, which essentially is a look up table, is within a one byte segment of memory the output maximum is set to 255. The present log table is derived utilizing the empirical formula Output$=14+100\times\log$ (Input), except, as previously mentioned, that when Input$=0$ the Output is set to zero. Thus, the desired constraints are provided and those values which, in a conventional voice recognition apparatus, would ordinarily be multiplicants are now sums.

As previously mentioned, the resultant array sums from the summing means 88 are preferably weighted. In one implementation the weighting mechanism includes summers 130A and 130B having as one input thereto a constant value, for example stored in an associated memory, 132A and 130B. The constant values are, by means of the summers, 130A and 130B, subtracted from the output from the summing means 88. For the system bias summation, the weighted value is equal to 256 times the log (T), whereas as the weighting value for the reference template sum is 256 times the log (N).

The weighting values are, effectively, normalization constants that enable the resultant scores to be independant of the number of times each word was enrolled. As a result, the thresholds selected for the comparators, 112 and 114, are constant regardless of the number of enrollments. But for this normalization the threshold values used in scoring would have to be adapted to vary according to the number of times a particular word was enrolled. This would increase the complexity of scoring and deter a user from enrolling a limited part of the total vocabulary library more than the remainder. Such selected increased enrollment of particular words is preferable due, for example, to the inherent nature of any language having words sounding similar to each other.

Referring to FIGS. 3A to 3C, one major difference of the present apparatus 10 over conventional voice recognition systems is depicted by the template format for the utterance template 134 and the enrolled templates, 136 and 138. As shown, the utterance template 134 is composed of a plurality of binary values representing features extracted from a voice signal. The enrolled templates, 136 and 138, however, include values at each position thereof, representing the total number of occurrences of, for example, a binary one in any utterance template during enrollment. Hence, all features from all utterance templates are used for scoring during the recognition phase. Ultimately, rather than relying on those bits remaining in a stored utterance format reference template, the actual probability of occurrence of a particular binary bit is used to score each utterance template. Such an approach clearly increases the accuracy of the template matching procedure. In fact, the template scoring accuracy is such that the means 24 for scoring a template, in fact, only produces either an accept signal or a reject signal. This is in clear contrast to conventional systems that frequently either request further information, request word repetition, or advise the user that there was insufficient information to score or recognize the word in question.

Figure 4:
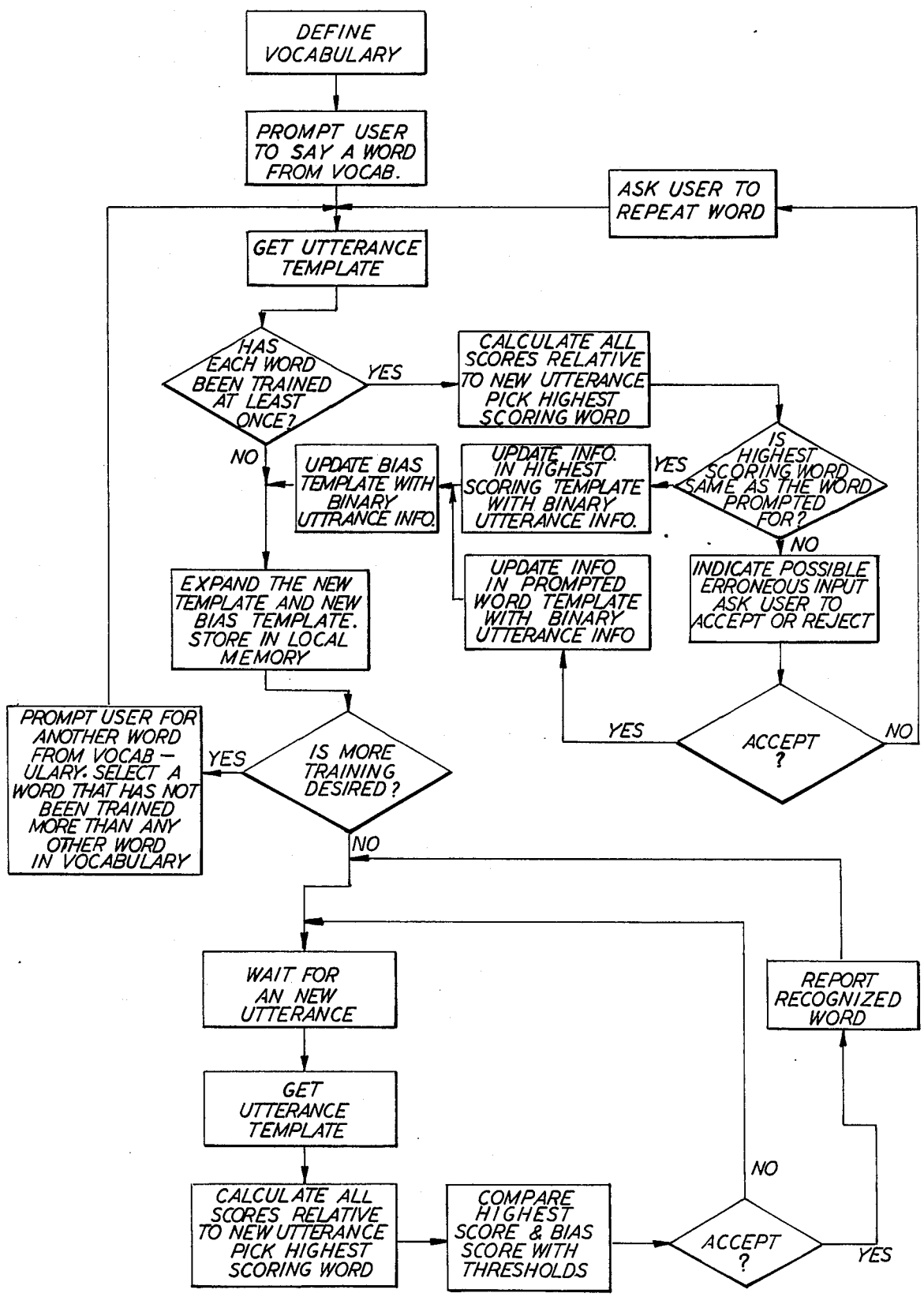
FIG. 4 is a flow diagram of a word recognition method used with the apparatus shown in FIG. 1.

The employment of the present apparatus 10 thus provides a unique method for ascertaining and recognizing a spoken word by use of template matching. As shown in FIG. 4, the method includes the step of first enrolling a plurality of words and maintaining all extracted features relative thereto. The enrolled data is expanded according to the logarithmic scale, discussed above, and stored in the expanded memory means.

During recognition the outputs from the selected memories are summed and weighted to result in a score which definitively rejects or accepts a spoken word.

It will be understood that the information stored in the buffer 108 further includes positional information with regard to the particular reference template being scored. Consequently, once the highest score is established, the location in the expanded memories is known and is accessable to ascertain the exact intended consequence of the acceptance signal generated by the AND gate.

In one alternative embodiment it will be recognized that the means for modifying the stored enrolled templates can be inserted between the expanded memories and the respective shift registers. However, as this would increase the actual summation time it is preferred that the modification means be positioned between the enrollment memory and the modified memory.

The apparatus 10 described herein can be substantially implemented on a iAPx 8088 microprocessor chip, for example, that manufactured and marketed by Intel Corporation of Sunnyvale, Calif., in conjunction with a conventional 64 kbit dynamic random access memory (RAM) bank.

The present apparatus 10 offers numerous advantages over conventional devices. First, since it utilizes a bias template any differences resulting from differences in personnel during enrollment or during the use, as well as differences in particular equipment are eliminated. In addition, since all data generated is retained and utilized, the accuracy is increased. Further, the entire scoring procedure is quite fast since all arithemic operations are summations rather than multiplications. Still further, the contents of the reference template is significantly different than that of the utterance template being scored. More specifically, the data in the utterance template is binary and derived from frequency versus time procedures whereas the data in the reference template is based on the probabilities of occurrence of a particular binary value in that particular position.

Although the present invention has been described herein, with reference to an exemplary embodiment it will be understood that other configurations will be comtemplated which nevertheless do not depart from the spirit and scope of the present invention. Consequently, the present invention is is deemed limited only by the appended claims and the reasonable interpretation thereof.

What is claimed is:

1. An apparatus for speech recognition, said apparatus comprising:

means responsive to speech for forming an utterance template having a plurality of positions, each position representing a spectral feature of said speech and having a binary value assigned thereto;

an utterance template register connected to said means for forming an utterance template and having a plurality of positions corresponding to the positions of said utterance template, said binary values being stored in said positions;

a plurality of reference templates, each representing different selected speech and each having a plurality of positions, each of said positions of each said reference template representing a spectral feature corresponding to the spectral features represented by said plurality of positions of said utterance template, each said positions in each said reference template having a value stored therein, said stored value being representative of a probability of a particular binary value occurring in said corresponding position of said utterance template for the speech represented by the reference template having the value stored therein; and means for establishing a first score for each said reference template, each said score being indicative of a relative match between that said reference template and said utterance template, said first score establishing means includes means for providing outputs from said reference template, each said output corresponding to one of said plurality of positions of said reference template and having a value determined from said stored value therein, means for selecting outputs of the reference templates corresponding to positions of the utterance template having the particular binary value stored therein and means for summing said selected outputs to provide said first scores for the reference templates, whereby the score is indicative of said relative match, and said speech represented by said utterance template is recognized as the speech represented by the reference template having the highest score that exceeds a predetermined threshold.

2. Apparatus as claimed in claim 1, further comprising:
a bias template, said bias template having a plurality of positions corresponding to said plurality of positions of said utterance template, each said position of said bias template having a value stored therein, said stored value being representative of the probability of a particular binary value occurring in said corresponding position of any utterance template; and
means for establishing a second score by adding the values stored in the positions of the bias template corresponding to positions of the utterance template having the particular binary value stored therein, said second score being indicative of a relative match between said bias template and said utterance template.

3. Apparatus as claimed in claim 2, wherein said second score establishing means includes:
means for providing outputs from said bias template, each said output corresponding to one of said plurality of positions of said bias template and having a value determined from said stored value therein; and
means for summing outputs of the bias template corresponding to positions of the utterance template having the particular binary value stored therein, whereby the sum is indicative of said relative match between said bias template and said utterance template.

4. Apparatus as claimed in claim 3, further comprising:
means for expanding each said reference template into a first expanded reference template and a second expanded reference template, the values of said first expanded reference template representing the probability of a binary one occurring in the corresponding position of said utterance template and the values of said second expanded reference template representing the probability of a binary zero occurring at said corresponding position of said utterance template; and
means for expanding said bias template into a first expanded bias template and a second expanded bias template, the values of said first expanded bias template representing the probability of a binary one occurring in the corresponding position of any said utterance template and the values of said second expanded bias template representing the probability of a binary zero occurring at said corresponding position of any said utterance template.

5. Apparatus as claimed in claim 4 wherein said first score establishing means includes:
means for selecting for each position of the expanded reference templates either the output from said first expanded reference template if the corresponding position in the utterance template contains a binary one or the output from said second expanded reference template if the corresponding position in the utterance template contains a binary zero for scoring each reference template.

6. Apparatus as claimed in claim 5 wherein said second score establishing means includes:
means for selecting for each position of the expanded bias templates either the output from said first expanded bias template if the corresponding position in the utterance template contains a binary one or the output from said second expanded bias template if the corresponding position in the utterance template contains a binary zero for scoring the bias template.

7. Apparatus as claimed in claim 6 further comprising:
means for converting said values in said plurality of reference templates and said values in said bias template to logarithmic.

8. Apparatus as claimed in claim 7 further comprising:
means for selecting the highest of said first scores;
means for comparing the highest of said first scores with a threshold; and
means for generating a recognition acceptance signal when said highest first score exceeds said threshold and a rejection signal when said highest first score is less than said threshold.

9. Apparatus as claimed in claim 8 further comprising:
means for comparing said second score with a second threshold; and
means for generating a recognition acceptance signal only when said highest first score exceeds said threshold and when said second score exceeds said second threshold.

10. Apparatus as claimed in claim 4 wherein:
said expanding means includes means for logarithmically converting said values in said plurality of reference templates and said values in said bias template.

11. Apparatus as claimed in claim 10 further comprising:
means for selecting the highest of said first scores;
means for comparing the highest of said first scores with a threshold; and
means for generating a recognition acceptance signal when said highest first score exceeds said threshold and a rejection signal when said highest first score is less than said threshold.

12. Apparatus as claimed in claim 1, further comprising:
means for enrolling said plurality of reference templates for said different selected speech, said means for enrolling including means for increasing the values stored in positions of a reference template for a selected speech each time an utterance template for the selected speech contains in corresponding positions the particular binary value, each said reference template being enrolled from a plurality of utterance templates formed from speech represented by the reference template being enrolled.

13. Apparatus as claimed in claim 12, further comprising:
a bias template having a plurality of positions corresponding to said plurality of positions of said utterance template, each said position of said bias template having a value stored therein, said stored value being representative of the probability of a particular binary value occurring in said corresponding position of any utterance template; and means for enrolling said bias template from all said utterance templates employed to enroll said reference templates, said means for enrolling including means for increasing the values stored in the positions of said bias template each time an utterance template, used to enroll said reference templates, contains in corresponding positions the particular binary value.

14. A method for recognizing speech, said method comprises the steps of:

providing in response to speech an utterance template having a plurality of positions, each having a binary value stored therein each said binary value in each said position representing a spectral feature of said speech;

providing a plurality of reference templates each representing different selected speech and each having a plurality of positions, each of said positions representing a spectral feature corresponding to the spectral features represented by said plurality of positions in said utterance template, and having a value stored therein, each stored value representing a probability of a particular binary value occurring in the corresponding position in said utterance template for the speech represented by the reference template having the value stored therein;

providing outputs from said reference templates, each output corresponding to one of said plurality of positions and having a value determined by said value stored therein;

selecting outputs of the reference templates corresponding to positions of the utterance template having the particular binary value stored therein;

summing the selected outputs of each said reference template, said sums being scores indicative of a relative match between the utterance template and the respective reference templates; and selecting the reference template having the highest score as representing the speech, whereby the speech represented by the utterance template is recognized as the speech represented by the reference template having the highest score.

15. Method as claimed in claim 14, comprising the further step of:

providing a bias template having a plurality of positions corresponding to said plurality of positions of said utterance template each said position having a value stored therein, said stored value representing the probability of a particular binary value occurring in the corresponding position in any said utterance template; and establishing a second score, indicative of a relative match between said bias template and said utterance template, by adding the values stored in the positions of the bias template corresponding to positions of the utterance template having the particular binary value stored therein.

16. Method as claimed in claim 15, wherein said second score establishing step includes:

providing outputs from said bias template, each output corresponding to one of said plurality of positions of said bias template and having a value determined by the value stored therein; and summing the outputs of the bias template corresponding to positions of the utterance template having the particular binary value stored therein.

17. Method as claimed in claim 15, further comprising the steps of:

expanding each said reference template into a first expanded reference template and a second expanded reference template, the values of said first expanded reference template representing the probability of a binary one occurring in the corresponding position of said utterance template and the values of said second expanded reference template representing the probability of a binary zero occurring at said corresponding position of said utterance template; and expanding said bias template into a first expanded bias template and a second expanded bias template, the values of said first expanded bias template representing the probability of a binary one occurring in the corresponding position of any said utterance template and the values of said second expanded bias template representing the probability of a binary zero occurring at said corresponding position of any said utterance template.

18. Method as claimed in claim 17 wherein said first score establishing step includes:

selecting for each position of the expanded reference templates either the output from said first expanded reference template if the corresponding position in the utterance template contains a binary one or the output from said second expanded reference template if the corresponding position in the utterance template contains a binary zero for scoring each reference template.

19. Method as claimed in claim 18 wherein said second score establishing step includes:

selecting for each position of the expanded bias templates either the output from said first expanded bias template if the corresponding position in the utterance template contains a binary one or the output from said second expanded bias template if the corresponding position in the utterance template contains a binary zero for scoring the bias template.

20. Method as claimed in claim 19 further comprising the step of:

converting said values in said plurality of reference templates and said values in said bias template to logarithmic data.

21. Method as claimed in claim 20 further comprising the step of:

selecting the highest of said scores;

comparing the highest of said first scores with a threshold; and generating a recognition acceptance signal when said highest first score exceeds said threshold and a rejection signal when said highest first score is less than said threshold.

22. Method as claimed in claim 21 further comprising the step of:

comparing said second score with a second threshold; and generating a recognition acceptance signal only when said highest first score exceeds said threshold and when said second score exceeds said second threshold.

23. Method as claimed in claim 17 wherein said expanding step includes:

logarithmically converting said values in said plurality of reference templates and said values in said bias template.

24. Method as claimed in claim 23 further comprising the step:
selecting the highest of said first scores;
comparing the highest of said scores with a threshold; and
generating a recognition acceptance signal when said highest first socre exceeds said threshold and a rejection signal when said highest first score is less than said threshold.

25. Method as claimed in claim 14, further comprising the step of:
enrolling said plurality of reference templates for said different selected speech by increasing the values stored in positions of a reference template for a selected speech each time an utterance template for the selected speech contains in corresponding positions the particular binary value, each said reference template being enrolled from a plurality of utterance templates formed from speech represented by the reference template being enrolled.

26. Method as claimed in claim 25, further comprising the step of:
enrolling a bias template, said bias template having a plurality of positions corresponding to said plurality of positions of said utterance template, each said position of said bias template having a value stored therein, said stored value being representative of the probability of a particular binary value occurring in said corresponding position of any utterance template, said bias template being enrolled from all said utterance templates employed to enroll said reference templates by increasing the values stored in positions of the bias template each time an utterance template, used to enroll said reference templates, contains in corresponding positions the particular binary value.

27. Apparatus for use in speech recognition, said apparatus comprising:
means responsive to speech for forming an utterance template, composed of a plurality of positions, each position representing a spectral feature of said speech and having a binary value assigned thereto;
an utterance template register connected to said means for forming an utterance template and having a plurality of positions corresponding to the positions of said utterance template, said binary values being stored in said positions;
a plurality of reference templates, each representing different selected speech and each having a plurality of positions, each of said positions of each said reference template representing a spectral feature corresponding to the spectral features represented by said plurality of positions of said utterance template, each said position in each said reference template having a value stored therein, said stored value being representative of a probability of a particular binary value occurring in said corresponding position of said utterance template for the speech represented by the reference template having the value stored therein;
a bias template having a plurality of positions, each of one of said plurality of positions representing a spectral feature corresponding to the spectral features represented by said plurality of positions in said utterance template, each position of said bias template having a value stored therein representing the probability of a particular binary value occurring at said corresponding position in any utterance template; and
means for establishing a score for each reference template based on said values stored therein and on the values stored in said bias template, said scores being indicative of a relative match between said reference template and said utterance template, whereby said speech represented by said utterance template is recognized as the speech represented by the reference template having the highest score that exceeds a predetermined threshold.

28. Apparatus as claimed in claim 27 further comprising:
means for expanding said bias template into a first and a second bias template, each having positions corresponding to said plurality of positions in said utterance templates, said first bias template having bias values stored in each position therein representing the probability of a binary one occurring at said corresponding position in said utterance template and said second bias template having bias values stored in each position therein representing the probability of a binary zero occurring at said corresponding position in said utterance template.

* * * * *